US010367398B2

(12) United States Patent
Tojima et al.

(10) Patent No.: US 10,367,398 B2
(45) Date of Patent: Jul. 30, 2019

(54) DOUBLE-STATOR SWITCHED RELUCTANCE ROTATING MACHINE

(71) Applicant: IHI Corporation, Tokyo (JP)

(72) Inventors: Narifumi Tojima, Tokyo (JP); Takehiro Jikumaru, Tokyo (JP); Norihisa Handa, Tokyo (JP); Koshi Ishimoto, Tokyo (JP); Gen Kuwata, Tokyo (JP); Satoru Ohashi, Tokyo (JP); Toshiyuki Hirao, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/279,923

(22) Filed: Sep. 29, 2016

(65) Prior Publication Data
US 2017/0019005 A1    Jan. 19, 2017

Related U.S. Application Data

(63) Continuation of application No. PCT/JP2015/060469, filed on Apr. 2, 2015.

(30) Foreign Application Priority Data

Apr. 2, 2014  (JP) ................ 2014-076059

(51) Int. Cl.
*H02K 16/04* (2006.01)
*H02K 29/03* (2006.01)
*H02K 19/10* (2006.01)
*H02K 1/14* (2006.01)
(Continued)

(52) U.S. Cl.
CPC .............. *H02K 16/04* (2013.01); *H02K 1/14* (2013.01); *H02K 1/246* (2013.01); *H02K 19/103* (2013.01); *H02K 29/03* (2013.01); *H02K 19/24* (2013.01); *H02K 2201/06* (2013.01); *H02K 2213/03* (2013.01)

(58) Field of Classification Search
CPC .......... H02K 16/04; H02K 1/14; H02K 1/246; H02K 19/103
USPC ........................................................ 310/112
See application file for complete search history.

(56) References Cited

U.S. PATENT DOCUMENTS

| 5,111,096 A | 5/1992 | Horst |
| 5,122,697 A | 6/1992 | Horst |

(Continued)

FOREIGN PATENT DOCUMENTS

| CN | 101710769 A | 5/2010 |
| CN | 203104235 U | 7/2013 |

(Continued)

OTHER PUBLICATIONS

Variable Speed Generators, Chapter 9, pp. 10-36.
(Continued)

*Primary Examiner* — Terrance L Kenerly
(74) *Attorney, Agent, or Firm* — Rothwell, Figg, Ernst & Manbeck, P.C.

(57) ABSTRACT

A double-stator switched reluctance motor includes an annular rotor, an outer stator disposed outside the rotor, and an inner stator disposed inside the rotor. Phases of the salient poles in a rotational direction of the rotor are different from each other in at least one of a set of first stator salient poles and second stator salient poles and a set of first rotor salient poles and second rotor salient poles.

8 Claims, 8 Drawing Sheets

(51) Int. Cl.
*H02K 1/24* (2006.01)
*H02K 19/24* (2006.01)

(56) References Cited

U.S. PATENT DOCUMENTS

| | | | |
|---|---|---|---|
| 5,751,089 A * | 5/1998 | Stridsberg | H02K 1/185 |
| | | | 310/266 |
| 6,172,440 B1 | 1/2001 | Sasaki et al. | |
| 8,922,087 B1 * | 12/2014 | Rittenhouse | H02K 1/148 |
| | | | 310/112 |
| 2010/0066085 A1 | 3/2010 | Gu et al. | |
| 2010/0244616 A1 | 9/2010 | Li et al. | |
| 2011/0285238 A1 | 11/2011 | Kusase et al. | |
| 2013/0057091 A1 * | 3/2013 | Kim | H02K 21/44 |
| | | | 310/46 |
| 2014/0111038 A1 * | 4/2014 | Yang | H02K 16/00 |
| | | | 310/46 |

FOREIGN PATENT DOCUMENTS

| | | |
|---|---|---|
| EP | 2 042 729 A1 | 4/2009 |
| JP | 5-176504 A | 7/1993 |
| JP | 5-292716 A | 11/1993 |
| JP | 5-336715 A | 12/1993 |
| JP | 7-163105 A | 6/1995 |
| JP | 7-336967 A | 12/1995 |
| JP | 8-214519 A | 8/1996 |
| JP | 9-285086 A | 10/1997 |
| JP | 10-70875 A | 3/1998 |
| JP | 3060610 B2 | 7/2000 |
| JP | 2001-186693 A | 7/2001 |
| JP | 3188727 B2 | 7/2001 |
| JP | 3245944 B2 | 1/2002 |
| JP | 3633272 B2 | 3/2005 |
| JP | 3704857 B2 | 10/2005 |
| JP | 2006-246871 A | 9/2006 |
| JP | 2008-92650 A | 4/2008 |
| JP | 2008-302789 A | 12/2008 |
| JP | 2009-136150 A | 6/2009 |
| JP | 2009-540172 A | 11/2009 |
| JP | 2010-98802 A | 4/2010 |
| JP | 4539216 B2 | 9/2010 |
| JP | 4655084 B2 | 3/2011 |
| JP | 2011-199995 A | 10/2011 |
| JP | 2011-244643 A | 12/2011 |
| JP | 4923633 B2 | 4/2012 |
| JP | 2013-74743 A | 4/2013 |

OTHER PUBLICATIONS

Abbasian et al., "High Torque Double-Stator Switched Reluctance Machine for Electric Vehicle Propulsion," Vehicle Power and Propulsion Conference (VPPC), 2010 IEEE (5 pages).

Lin, et al., "Optimal Design of Double Stator Switched Reluctance Machine (DSSRM)," Industrial Electronics (ISIE), 2012 IEEE International Symposium, May 28-31, 2012 (6 pages).

* cited by examiner (a)

(b)

DOUBLE-STATOR SWITCHED RELUCTANCE ROTATING MACHINE

This application is a Continuation of International Application No. PCT/JP2015/060469, filed on Apr. 2, 2015, claiming priority based on Japanese Patent Application No. 2014-076059, filed on Apr. 2, 2014, the content of which is incorporated herein by reference in their entirety.

TECHNICAL FIELD

Embodiments described herein relates to a double-stator switched reluctance rotating machine.

BACKGROUND ART

A switched reluctance rotating machine does not include a permanent magnet or a winding wire in a rotor, and is operated by magnetic attraction generated between the rotor and a stator. The switched reluctance rotating machine has possibility of occurring vibration, noise, and the like in principle. However, the switched reluctance rotating machine has a simple and solid structure, can also withstand high-speed rotation, and is inexpensive since the switched reluctance rotating machine does not require expensive permanent magnets such as neodymium magnets. For this reason, in recent years, research and development for switched reluctance rotating machines as a rotating machine, which is inexpensive and excellent in reliability, has progressed for a practical use.

For example, Patent Document 1 and Patent Document 2 are known as the switched reluctance rotating machine. Patent Document 1 and Patent Document 2 disclose switched reluctance rotating machines that include salient poles of a stator and salient poles of a rotor formed in specific shapes to reduce torque ripple that causes vibration and noise.

CITATION LIST

Patent Document

[Patent Document 1] Japanese Unexamined Patent Application, First Publication No. H5-336715
[Patent Document 2] Japanese Unexamined Patent Application, First Publication No. 2001-186693

SUMMARY

Technical Problem

As a part of the progress to practical use, a double-stator structure has been proposed in recent years in order to improve the performance of the switched reluctance rotating machine. It is assumed that vibration and noise are further increased in a case in which this double-stator structure is employed.

The formation of the salient poles of the stator having a specific shape and the salient poles of a rotor having a specific shape as in the related art is considered to reduce the vibration and the noise. However, since fine brittle portions are formed in the shapes of the salient poles when the salient poles of the stator and the salient poles of the rotor are formed in specific shapes, solidity deteriorates and time and effort are required for manufacture. For this reason, costs may be increased.

The present disclosure has been made in consideration of the above-mentioned circumstances, and an object of the disclosure is to provide a double-stator switched reluctance rotating machine that has a simple and solid structure, can be easily manufactured, and can reduce torque ripple.

Solution to Problem

In a first aspect of the disclosure, a double-stator switched reluctance rotating machine includes a rotor, an outer stator disposed outside the rotor, and an inner stator disposed inside the rotor. The outer stator includes first stator salient poles that are provided on a side thereof facing the rotor. The inner stator includes second stator salient poles which are provided on a side thereof facing the rotor and of which the number is the same as the number of the first stator salient poles. The rotor includes first rotor salient poles that are provided on a side thereof facing the outer stator, and second rotor salient poles which are provided on a side thereof facing the inner stator and of which the number is the same as the number of the first rotor salient poles. Phases of the salient poles in a rotational direction of the rotor are different from each other in at least one of a set of the first stator salient poles and the second stator salient poles and a set of the first rotor salient poles and the second rotor salient poles.

In the first aspect of the disclosure, at least one of the phases of the salient poles of the outer and inner stators and the phases of the salient poles, which are provided on the outside and inside of the rotor, are shifted in the rotational direction of the rotor; and the peak of the waveform of the torque applied to the side of the rotor facing the outer stator and the peak of the waveform of the torque applied to the side of the rotor facing the inner stator are made not to correspond to each other. As a result, torque ripple caused by the resultant torque of the torque is reduced. For this reason, since the shapes of the salient poles are not changed and the phases of the salient poles are merely shifted, the double-stator switched reluctance rotating machine has a simple and solid structure and can be easily manufactured.

In a second aspect of the disclosure, phases of the salient poles in the rotational direction of the rotor are different from each other in the set of the first stator salient poles and the second stator salient poles.

In a third aspect of the disclosure, phases of the salient poles in the rotational direction of the rotor are different from each other in the set of the first rotor salient poles and the second rotor salient poles.

In a fourth aspect of the disclosure, phases of the salient poles in the rotational direction of the rotor are different from each other in the set of the first stator salient poles and the second stator salient poles and the set of the first rotor salient poles and the second rotor salient poles.

In a fifth aspect of the disclosure, a phase shift angle of the salient pole in the rotational direction of the rotor is set to a half of a stroke angle that is obtained according to the number of phases of the stator and the number of poles of the rotor.

In a sixth aspect of the disclosure, a phase shift angle of the salient pole in the rotational direction of the rotor is set according to the magnitude of a current in the stator.

In a seventh aspect of the disclosure, a double-stator switched reluctance rotating machine includes: an outer stator that includes first salient poles; an inner stator including second salient poles that are to face the first salient poles; and a rotor that is provided between the outer stator and the inner stator and include third salient poles, which are to face the first salient poles, and fourth salient poles, which are to face the second salient poles. The first and second salient poles or the third and fourth salient poles have a phase difference in a rotational direction of the rotor.

In an eighth aspect of the disclosure, a phase of the second salient pole is delayed from a phase of the first salient pole.

In a ninth aspect of the disclosure, a phase of the fourth salient pole is advanced from a phase of the third salient pole.

In a tenth aspect of the disclosure, a phase of the second salient pole is delayed from a phase of the first salient pole and a phase of the fourth salient pole is advanced from a phase of the third salient pole.

According to the disclosure, a double-stator switched reluctance rotating machine, which has a simple and solid structure, can be easily manufactured, and can reduce torque ripple, is obtained.

DESCRIPTION OF EMBODIMENTS

An example of an embodiment of the disclosure will be described below with reference to the drawings.

Figure 1:
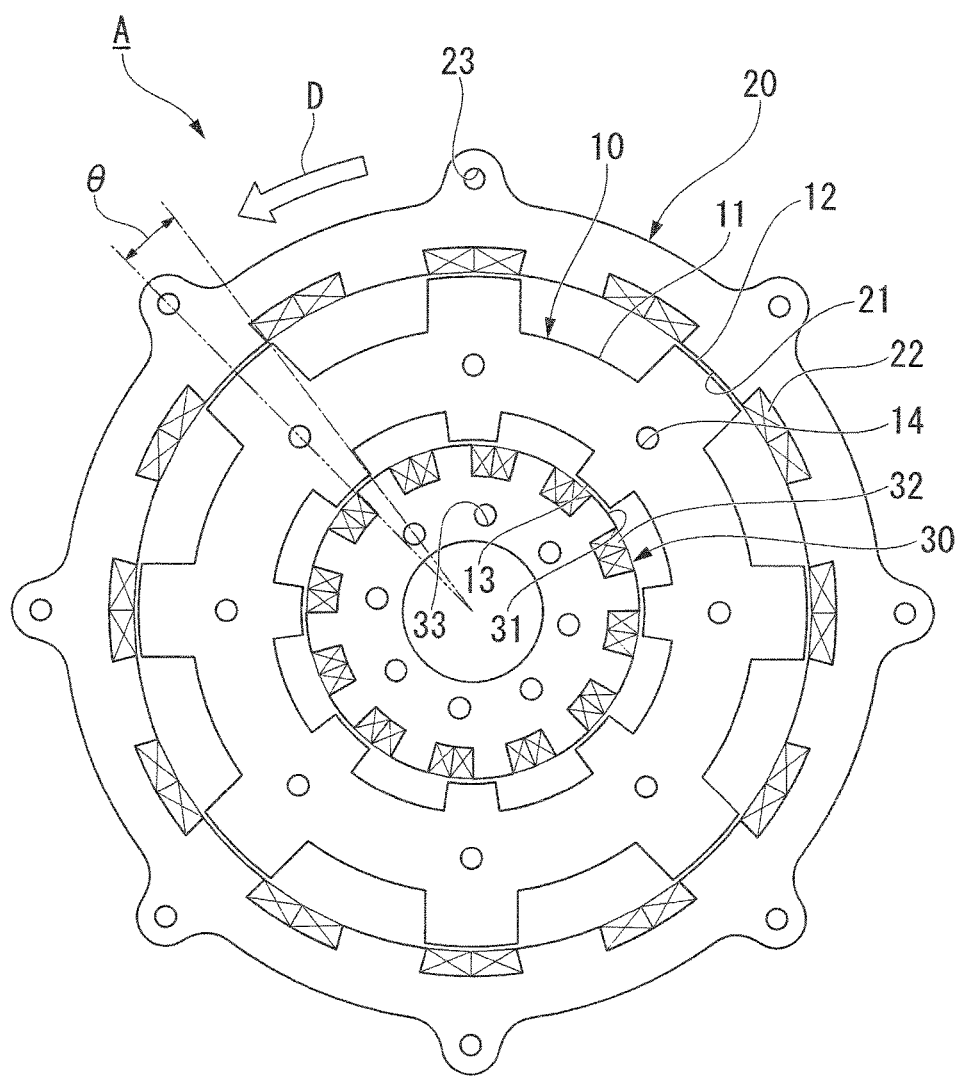
FIG. 1 is a cross-sectional view of a double-stator switched reluctance motor according to an embodiment of the disclosure.
Figure 2:
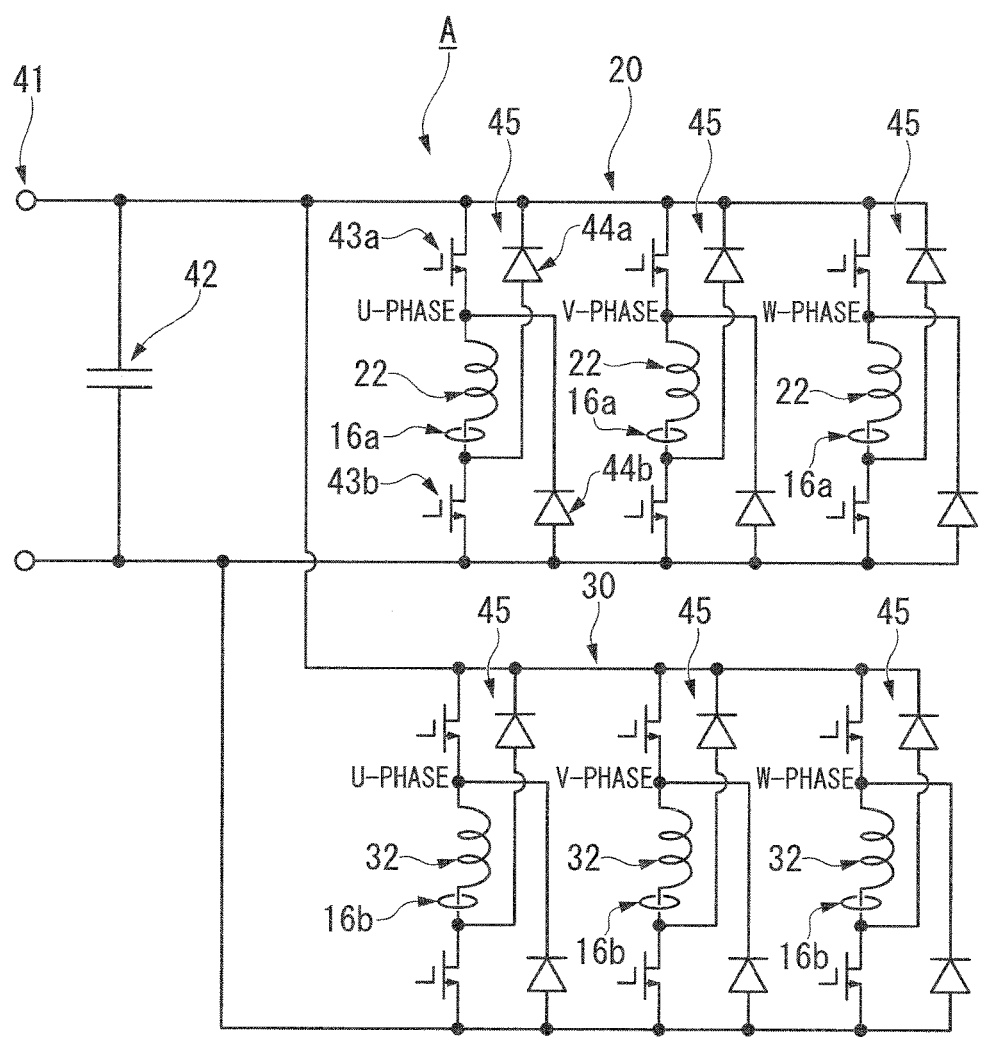
FIG. 2 is a circuit diagram of the double-stator switched reluctance motor according to an embodiment of the disclosure.
Figure 3:
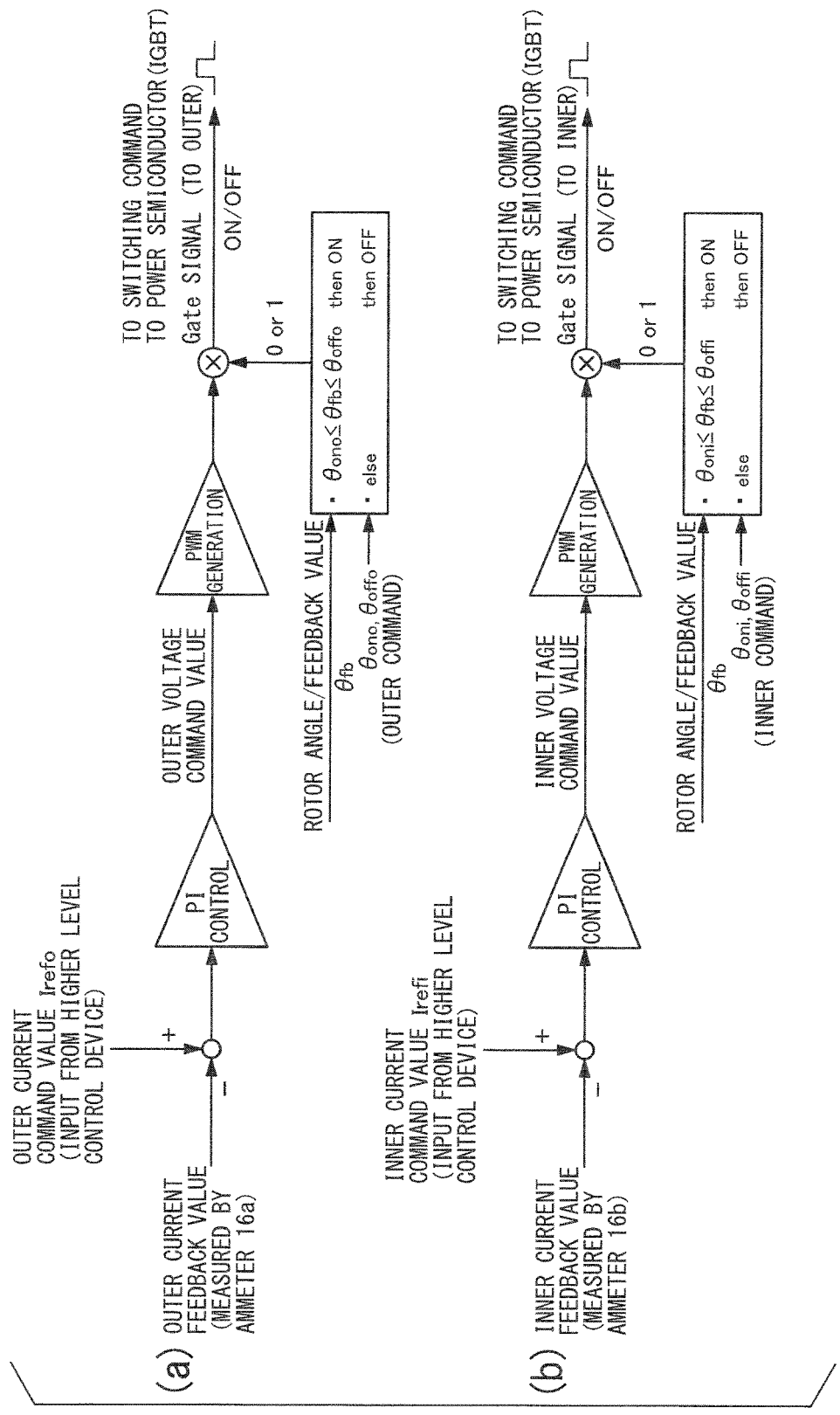
FIG. 3 is a view showing control logics of the double-stator switched reluctance motor according to an embodiment of the disclosure.

FIG. 1 is a cross-sectional view of a double-stator switched reluctance motor A according to an embodiment of the disclosure. FIG. 2 is a circuit diagram of the double-stator switched reluctance motor A according to the embodiment of the disclosure. FIG. 3 is a view showing control logics of the double-stator switched reluctance motor A according to the embodiment of the disclosure.

As shown in FIG. 1, the double-stator switched reluctance motor A (hereinafter, simply referred to as a switched reluctance motor A in some cases) includes an annular rotor 10, an outer stator 20 that is disposed outside the rotor 10, and an inner stator 30 that is disposed inside the rotor 10. The switched reluctance motor A according to the present embodiment is a three-phase motor having a U-phase, a V-phase, and a W-phase, and has a three-phase 12/8-pole structure in which the number of poles of the stator (each of the outer stator 20 and the inner stator 30) is 12 and the number of poles of the rotor is 8.

The rotor 10 is formed so that a plurality of electromagnetic steel sheets are fastened and fixed by bolt members (not shown) inserted into bolt fastening holes 14 while being laminated in an axial direction (a direction perpendicular to the plane of FIG. 1). The rotor 10 includes an annular yoke portion 11, first rotor salient poles 12 (third salient poles) that protrude outward from the yoke portion 11, and second rotor salient poles 13 (fourth salient poles) which protrude inward from the yoke portion 11 and of which the number is the same as the number of the first rotor salient poles 12. The yoke portion 11 is formed in a cylindrical shape, and has a thickness that is magnetically sufficient. Eight first rotor salient poles 12 are provided on the outer periphery of the yoke portion 11 at intervals of 45°. Further, eight second rotor salient poles 13 are provided on the inner periphery of the yoke portion 11 at intervals of 45° so as to have the same phase as the first rotor salient poles 12.

The outer stator 20 is an annular magnetic body including 12 first stator salient poles 21 (first salient poles) that are provided on the inner periphery of the outer stator at intervals of 30° and coils 22 that are wound on the first stator salient poles 21, respectively. The coils 22 are arranged so that phases are a U-phase, a V-phase, a W-phase, and a U-phase in order, in a circumferential direction. The outer stator 20 is mounted on a motor housing (not shown) at a predetermined mounting angle by bolt members (not shown) that are inserted into bolt fastening holes 23 passing through the outer stator 20 in an axial direction.

The inner stator 30 is an annular magnetic body including 12 second stator salient poles 31 (second salient poles) which are provided on the outer periphery of the inner stator 30 at intervals of 30° and of which the number is the same as the number of the first stator salient poles 21 and coils 32 that are wound on the second stator salient poles 31, respectively. Just like the coils 22, the coils 32 are arranged so that phases are a U-phase, a V-phase, a W-phase, and a U-phase in order, in the circumferential direction. The inner stator 30 is mounted on the motor housing (not shown) at a predetermined mounting angle by bolt members (not shown) that are inserted into bolt fastening holes 33 passing through the inner stator 30 in the axial direction.

The switched reluctance motor A having the above-mentioned structure includes inverter circuits shown in FIG. 2. In FIG. 2, reference numeral 41 denotes a DC power source and reference numeral 42 denotes a smoothing capacitor. Further, the outer stator 20 is provided with four coils 22 for each phase, but only one coil 22 for each phase will be shown to represent the coils 22 for the improvement of visual recognition and the rest of the coils 22 will not be shown. In this case, the four coils 22 for each phase of the outer stator 20 may be connected to each other in series or may be connected to each other in parallel. Furthermore, likewise, the inner stator 30 is also provided with four coils 32 for each phase, but only one coil 32 for each phase will be shown to represent the coils 32 for the improvement of visual recognition and the rest of the coils 32 will not be shown. In this case, the four coils 32 for each phase of the inner stator 30 may be connected to each other in series or may be connected to each other in parallel.

As shown in FIG. 2, the outer and inner stators 20 and 30 are connected to each other in parallel. In the present embodiment, the inverter circuit of the outer stator 20 and the inverter circuit of the inner stator 30 are connected to each other in parallel. Each of the inverter circuits includes an asymmetric half bridge circuit 45 that includes two switching elements 43a and 43b and two diodes 44a and 44b. The asymmetric half bridge circuits 45 are connected to the coils 22 of the outer stator 20 and the coils 32 of the inner stator 30, respectively. The coils 22 and 32 can be individually driven (currents are applied to the coils 22 and 32) by the respective asymmetric half bridge circuits 45.

In the present embodiment, the switched reluctance motor A includes a plurality of ammeters 16a that control currents flowing in the respective coils 22 of the outer stator 20 and a plurality of ammeters 16b that measure currents flowing in the respective coils 32 of the inner stator 30. The ammeters 16a and 16b measure the currents flowing in the coils 22 and 32, and independently control the currents of the outer and inner stators 20 and 30.

(a) of FIG. 3 shows a control logic of the current control of the outer stator 20, and (b) of FIG. 3 shows a control logic of the current control of the inner stator 30.

PI control is performed in the current control of the outer stator 20 so that a deviation between the value (outer current feedback value) of a current, which flows in the coil 22, measured by the ammeter 16a and an outer current command value Irefo (target value) input from a higher level control device (not shown) is eliminated. Accordingly, an outer voltage command value is obtained. This outer voltage command value is actually common to all of four U-phase coils 22, four V-phase coils 22, and four W-phase coils 22. Further, the outer voltage command value is converted using pulse width modulation (PWM), and a gate signal generated so as to correspond to the command value is sent to the switching elements 43a and 43b (see FIG. 2) formed of power semiconductors. Specifically, in a case in which currents are applied to the four U-phase coils 22 (for example, pulse currents flow in the four U-phase coils 22), gate signals, which allow the respective switching elements to be simultaneously turned on, are sent to all the respective switching elements corresponding to the four U-phase coils 22. Likewise, in a case in which currents are applied to the four V-phase coils 22 (for example, pulse currents flow in the four V-phase coils 22), gate signals, which allow the respective switching elements to be simultaneously turned on, are sent to all the respective switching elements corresponding to the four V-phase coils 22. Further, in a case in which currents are applied to the four W-phase coils 22 (for example, pulse currents flow in the four W-phase coils 22), gate signals, which allow the respective switching elements to be simultaneously turned on, are sent to all the respective switching elements corresponding to the four W-phase coils 22.

The gate signal is generated so that "1" is output and a pulse is turned "ON" in a case in which a rotor angle θfb (feedback value) measured by an encoder (not shown) or the like is present between outer command values θono and θoffo and "0" is output and a pulse is turned "OFF" in other cases. Specifically, the outer command values θono and θoffo are set to different values for each of the U-phase, the V-phase, and the W-phase. That is, outer command values (θono and θoffo) defining a period in which currents are simultaneously applied to the four U-phase coils 22 (for example, pulse currents simultaneously flow in the four U-phase coils 22), outer command values (θono and θoffo) defining a period in which currents are simultaneously applied to the four V-phase coils 22 (for example, pulse currents simultaneously flow in the four V-phase coils 22), and outer command values (θono and θoffo) defining a period in which currents are simultaneously applied to the four W-phase coils 22 (for example, pulse currents simultaneously flow in the four W-phase coils 22) are set, and these three outer command values (θono and θoffo) are different values. When the outer command values θono and θoffo are set in this way, currents are applied to the U-phase coils, the V-phase coils, and the W-phase coils at different timings and the rotor can be rotated by magnetic attraction. The outer command values θono and θoffo for each of the U-phase, the V-phase, and the W-phase are set on the basis of table data of the rotating speed and the torque of the rotor 10, which are stored in advance, together with the outer current command value Irefo.

The table data are stored in a control device (not shown) in advance by experiments, analysis, and the like, and an optimum outer current command value Irefo and optimum outer command values θono and θoffo are determined from the rotating speed and the torque of the rotor 10.

PI control is performed in the current control of the inner stator 30 so that a deviation between the value (inner current feedback value) of a current, which flows in the coil 32, measured by the ammeter 16b and an inner current command value Irefi (target value) input from a higher level control device (not shown) is eliminated. Accordingly, an inner voltage command value is obtained. The inner voltage command value is actually common to all of four U-phase coils 32, four V-phase coils 32, and four W-phase coils 32.

Further, the inner voltage command value is converted using PWM, and a gate signal generated so as to correspond to the command value is sent to the switching elements 43a and 43b formed of power semiconductors.

Furthermore, the gate signal is generated so that "1" is output and a pulse is turned "ON" in a case in which a rotor angle θfb (feedback value) measured by an encoder (not shown) or the like is present between inner command values θoni and θoffi and "0" is output and a pulse is turned "OFF" in other cases. Specifically, the inner command values (θoni and θoffi) are set to different values for each of the U-phase, the V-phase, and the W-phase. That is, inner command values (θoni and θoffi) defining a period in which currents are simultaneously applied to the four U-phase coils 32 (for example, pulse currents simultaneously flow in the four U-phase coils 32), inner command values (θoni and θoffi) defining a period in which currents are simultaneously applied to the four V-phase coils 32 (for example, pulse currents simultaneously flow in the four V-phase coils 32), and inner command values (θoni and θoffi) defining a period in which currents are simultaneously applied to the four W-phase coils 32 (for example, pulse currents simultaneously flow in the four W-phase coils 32) are set, and these three inner command values (θoni and θoffi) are different values. When the inner command values are set in this way, currents are applied to the U-phase coils, the V-phase coils, and the W-phase coils at different timings and the rotor can be rotated by magnetic attraction.

The inner current command value Irefi and the inner command values θoni and θoffi for each of the U-phase, the V-phase, and the W-phase are determined on the basis of table data that are stored in advance by the above-mentioned method. However, since the table data are individually stored for the outer stator 20 and the inner stator 30, the currents of the outer and inner stators 20 and 30 are controlled independently of each other. Specifically, the outer current command value Irefo and the inner current command value Irefi are set independently of each other and the values of the outer current command value Irefo and the inner current command value Irefi are different from each other.

Further, the above-mentioned three outer command values (θono and θoffo) for the U-phase, the V-phase, and the W-phase and the three inner command values (θoni and θoffi) for the U-phase, the V-phase, and the W-phase are independently set in the present embodiment. Furthermore, since the phases of the first stator salient poles 21 of the outer stator 20 are different from the phases of the second stator salient poles 31 of the inner stator 30 in the rotational direction of the rotor as described below in the present embodiment, the outer command values (θono and θoffo) and the inner command values (θoni and θoffi) are set to different values according to the phases of the salient poles. The reason for this is that an appropriate rotor angle θfb where currents are to flow in the coils varies since the phases of the salient poles of the outer and inner stators 20 and 30 are different from each other.

Further, as shown in FIG. 2, in the present embodiment, the outer and inner stators 20 and 30 are connected to each other in parallel, magnetomotive forces of the outer and inner stators 20 and 30 are different from each other, and the magnetomotive force of the inner stator 30 is set to be smaller than the magnetomotive force of the outer stator 20. A magnetomotive force is obtained by the product of the number of windings of a coil and a current that flows in the coil. It is difficult to structurally ensure a sufficient winding space in the inner stator 30 in the double stator structure as shown in FIG. 1.

A method of reducing the cross-sectional area of a winding wire to increase the number of windings of the wire or a method of increasing the length (depth) of the second stator salient pole 31 of the inner stator 30 to ensure a winding space is considered to make the magnetomotive force constant in the switched reluctance motor A. However, since current density is increased in the former method, there are possibilities that the efficiency of a motor decreases and the temperature of the winding wire rises due to an increase of a copper loss.

Further, since an increase in the length (depth) of the second salient pole 31 is traded with the diameter of a shaft supporting the weight of the entire motor in the latter method, there is a possibility that mechanical strength cannot be sufficiently ensured for an increase in weight when the diameter of the shaft is reduced.

Accordingly, since the magnetomotive force of the inner stator 30 is set to be smaller than the magnetomotive force of the outer stator 20 in the present embodiment, a decrease in the efficiency of the motor and the rise of the temperature of the winding wire are suppressed and mechanical strength is sufficiently ensured. Since magnetic flux flowing out of one of the outer and inner stators 20 and 30 flows backward to the other thereof in a case in which the magnetomotive forces of the outer and inner stators 20 and 30 are different from each other, there is a concern that the performance of the motor may deteriorate. However, it is confirmed from an electromagnetic analysis test that an adverse effect is not generated when the thickness of the yoke portion 11 of the rotor 10 in a direction perpendicular to a rotor shaft is sufficiently ensured on the basis of magnetic characteristics as in the present embodiment.

When the outer and inner stators 20 and 30 are connected to each other in parallel, an effect of improving the performance of the motor is enhanced in comparison with a case in which the outer and inner stators 20 and 30 are connected to each other in series. The reason for this is that the magnetomotive force of the outer stator 20 to be mainly driven is significantly reduced due to the reduction of current since inductance is increased in the series connection.

On the other hand, since the magnetomotive force of the outer stator 20 can be ensured and an output of the inner stator 30 can be taken out in the parallel connection, the output is a simple sum of the outputs of the outer and inner stators 20 and 30. Accordingly, the performance of the motor is easily improved.

As described above, in the double-stator structure, the performance of the motor is improved but torque ripple is also increased with an increase of the output. For this reason, as shown in FIG. 1, the phases of the salient poles in the rotational direction of the rotor 10 are different from each other in a set of the first stator salient poles 21 of the outer stator 20 and the second stator salient poles 31 of the inner stator 30 in the switched reluctance motor A according to the present embodiment. Reference letter D shown in FIG. 1 denotes the rotational direction of the rotor 10 (counterclockwise).

The set of the first stator salient poles 21 of the outer stator 20 and the second stator salient poles 31 of the inner stator 30 is disposed so as to have a phase shift angle θ in the rotational direction of the rotor 10. Here, the phase shift angle θ means the sum of phase shift angles θ1 and θ2 to be described below (see also FIG. 8 to be described below). θ1 means a relative phase difference in the rotational direction of the rotor 10 between one salient pole (the first rotor salient pole 12) of the rotor 10 facing the outer stator 20 and one salient pole (the second rotor salient pole 13), which faces the inner stator 30 and is to face the salient pole (the first rotor salient pole 12) of the rotor 10 facing the outer stator 20, among the salient poles (first rotor salient poles 12) of the rotor 10 facing the outer stator 20 and the salient poles (the second rotor salient poles 13) of the rotor 10 facing the inner stator 30. θ2 means a relative phase difference in the rotational direction of the rotor 10 between one salient pole (the first stator salient pole 21) of the outer stator 20 and one salient pole (the second stator salient pole 31) of the inner stator 30, which is to face the salient pole (the first stator salient pole 21) of the outer stator 20, among the salient poles (the first stator salient poles 21) of the outer stator 20 and the salient poles (the second stator salient poles 31) of the inner stator 30. Further, in the case of θ1, the relative phase difference is a difference in a relative rotation angle according to a perpendicular bisector of an upper side of one salient pole (the first rotor salient pole 12) of the rotor 10 facing the outer stator 20 and a perpendicular bisector of an upper side of one salient pole (the second rotor salient pole 13), which faces the inner stator 30 and is to face this one salient pole (the first rotor salient pole 12), in the cross-sectional view of the motor as shown in FIG. 1. Furthermore, in the case of θ2, the relative phase difference is a difference in a relative rotation angle according to a perpendicular bisector of an upper side of one salient pole (the first stator salient pole 21) of the outer stator 20 and a perpendicular bisector of one salient pole (the second stator salient pole 31) of the inner stator 30 that is to face this one salient pole (the first stator salient pole 21). Since θ1 is 0°, the phase shift angle θ of the present embodiment is equal to θ2. Further, in a case in which θ1 is 0° and θ2 is also 0°, the switched reluctance motor A is the same as the switched reluctance motor in the related art and the salient poles of the outer and inner stators 20 and 30 face each other. Accordingly, the above-mentioned two perpendicular bisectors overlap each other in this case. Furthermore, since the salient poles (the first rotor salient poles 12) of the rotor 10 facing the outer stator 20 and the salient poles (the second rotor salient poles 13) of the rotor 10 facing the inner stator 30 face each other, the above-mentioned two perpendicular bisectors overlap each other. Here, the phase shift angle θ of the present embodiment is set to a half of the stroke angle of the switched reluctance motor A. The stroke angle Sθ is obtained from the following Equation (1) on the basis of the number in of phases of the stator and the number Nr of poles of the rotor.

$$S\theta = 360°/(m \times Nr) \tag{1}$$

In the present embodiment, the number m of phases of the stator is 3 (the U-phase, the V-phase, and the W-phase) and the number Nr of poles of the rotor is 8 (the first rotor salient poles 12 (second rotor salient poles 13)). In this case, 15 [deg] is obtained as the stroke angle Sθ from Equation (1). The phase shift angle θ is a half of the stroke angle Sθ, and is 7.5 [deg] in the present embodiment. The phase shift angle θ is theoretically obtained, and allows the torque ripple of the switched reluctance motor A to be approximately minimized as shown in FIG. 4.

Figure 4:
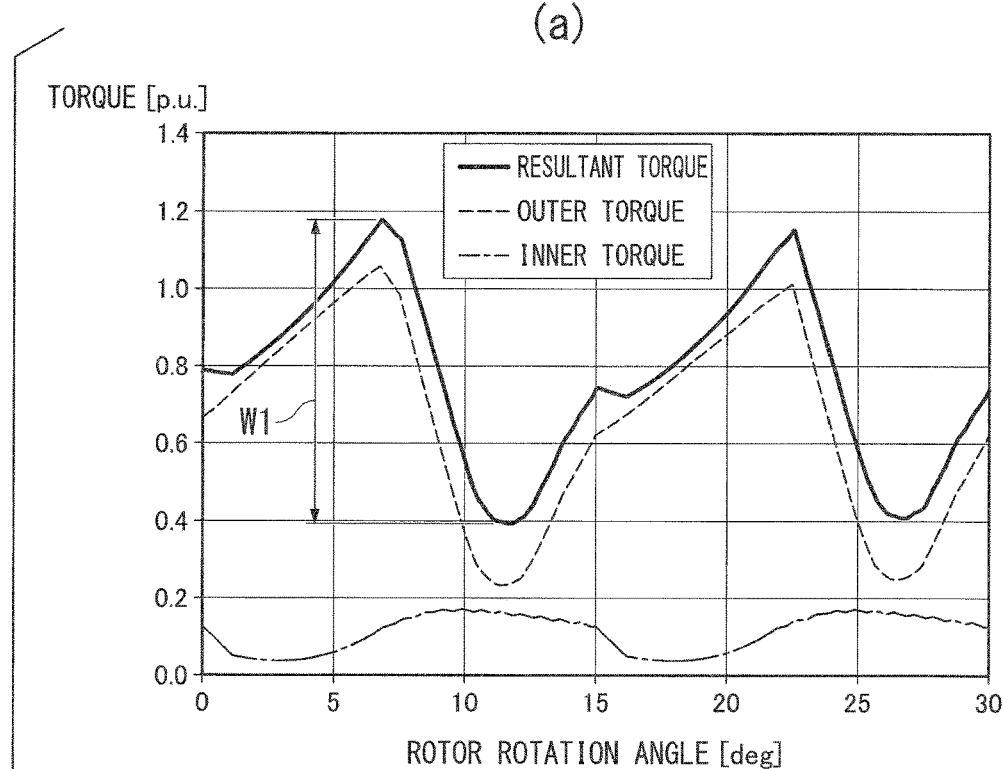
FIG. 4 is a graph showing an effect of reducing the torque ripple of the double-stator switched reluctance motor according to an embodiment of the disclosure.
Figure 4:
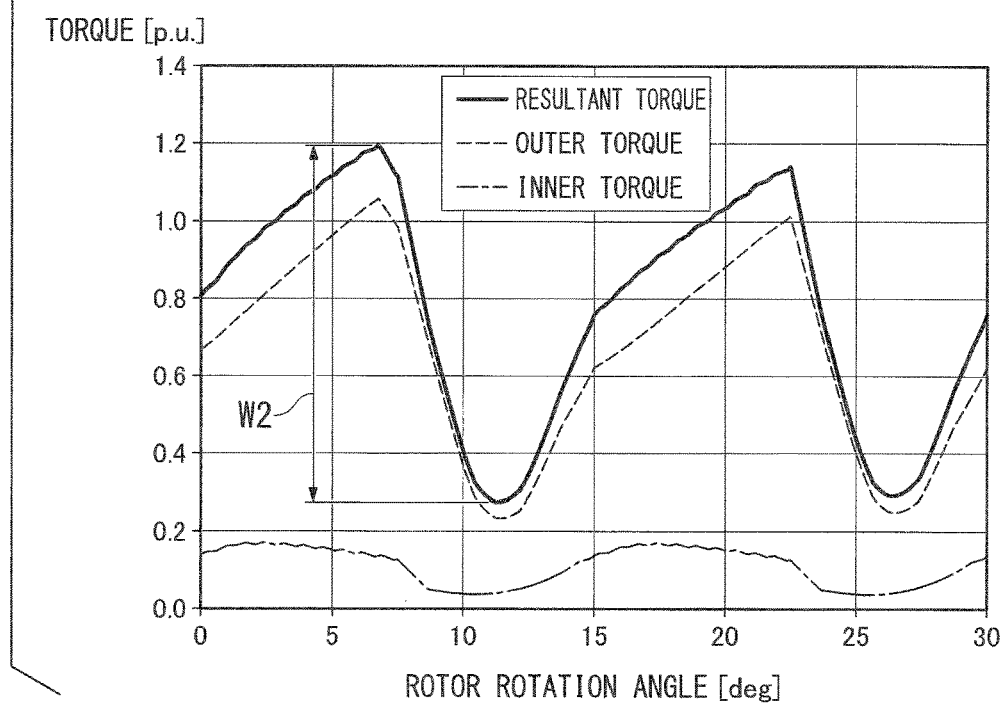

FIG. 4 is a graph showing an effect of reducing the torque ripple of the double-stator switched reluctance motor A according to the embodiment of the present disclosure. (a) of FIG. 4 shows the waveforms of torque of the switched reluctance motor A in which the phase shift angle θ is set to 7.5 [deg], and (b) of FIG. 4 shows the waveforms of torque of the switched reluctance motor A as a comparative example in which the phase shift angle θ is set to 0 [deg]. Further, in FIG. 4, a vertical axis represents torque [p.u.] and a horizontal axis represents a rotor rotation angle [deg].

In a case in which the phase shift angle θ is set to 0 [deg] (in a case in which the phases of the first stator salient poles 21 are the same as the phases of the second stator salient poles 31), the upper and lower peaks of the waveform of outer torque (shown by a dotted line) applied to the side of the rotor 10 facing the outer stator 20 and the upper and lower peaks of the waveform of inner torque (shown by a dashed-dotted line) applied to the side of the rotor 10 facing the inner stator 30 substantially correspond to each other as shown in (b) of FIG. 4. Accordingly, since the fluctuation range W2 of resultant torque (shown by a solid line) of the outer torque and the inner torque is increased, torque ripple is increased.

On the other hand, in a case in which the phase shift angle θ is set to 7.5 [deg] (in a case in which the phases of the first stator salient poles 21 are different from the phases of the second stator salient poles 31), the upper and lower peaks of the waveform of outer torque (shown by a dotted line) applied to the side of the rotor 10 facing the outer stator 20 and the upper and lower peaks of the waveform of inner torque (shown by a dashed-dotted line) applied to the side of the rotor 10 facing the inner stator 30 are shifted from each other by an approximately half of the phase and do not correspond to each other as shown in (a) of FIG. 4. This is based on the fact that the outer command values (θono and θoffo) and the inner command values (θoni and θoffi) are set to different values according to the phases of the salient poles since the phases of the first stator salient poles 21 of the outer stator 20 and the phases of the second stator salient poles 31 of the inner stator 30 in the rotational direction of the rotor are different from each other as described above. That is, since the outer command values (θono and θoffo) and the inner command values (θoni and θoffi) are set to different values according to the phases of the salient poles in the present embodiment, timings at which currents flow in each coil 22 of the outer stator 20 and each coil 32 of the inner stator 30 are different from each other. As a result, the timing of the peak of the outer torque and the timing of the peak of the inner torque are shifted from each other. Accordingly, since the fluctuation range W1 of resultant torque (shown by a solid line) of the outer torque and the inner torque becomes smaller than the fluctuation range W2, torque ripple is reduced.

Further, since the upper and lower peaks of the outer torque and the inner torque are inverted and combined as shown in (a) of FIG. 4 in a case in which the phase shift angle θ is set to 7.5 [deg] that is a half of the stroke angle, torque ripple can be approximately minimized.

In the present embodiment, each second stator salient pole 31 of the inner stator 30 has a phase delayed from the phase of each first stator salient pole 21 of the outer stator 20 in the rotational direction as shown in FIG. 1. However, as long as the thickness of the yoke portion 11 is sufficiently large without magnetic interference as described above, the same effect of reducing torque ripple is obtained even though each second stator salient pole 31 of the inner stator 30 has a phase advanced from the phase of each first stator salient pole 21 of the outer stator 20.

As described above, in the present embodiment, the phases of the first stator salient poles 21 of the outer stator 20 and the phases of the second stator salient poles 31 of the inner stator 30 are shifted from each other in the rotational direction of the rotor 10 and the peak of the outer torque applied to the side of the rotor 10 facing the outer stator 20 and the peak of the inner torque applied to the side of the rotor 10 facing the inner stator 30 are made not to correspond to each other. For this reason, torque ripple, which is caused by resultant torque of the outer torque and the inner torque, is reduced. According to this structure, since the shapes of the salient poles are not changed and the phases of the salient poles are merely shifted, the switched reluctance motor has a simple and solid structure and can be easily manufactured.

Further, in the present embodiment, the phases of the salient poles in the rotational direction of the rotor 10 are different from each other in the set of the first stator salient poles 21 of the outer stator 20 and the second stator salient poles 31 of the inner stator 30, which are originally and structurally separate from each other, of the switched reluctance motor A. According to this structure, it is possible to simply reduce torque ripple by only changing the mounting angles of the outer and inner stators 20 and 30 on the motor housing (not shown) without changing the structure of the rotor 10.

Accordingly, according to the above-mentioned present embodiment, the switched reluctance motor A, which includes the rotor 10, the outer stator 20 disposed outside the rotor 10, and the inner stator 30 disposed inside the rotor 10, is disclosed. In the switched reluctance motor A, the outer stator 20 includes the first stator salient poles 21 that are provided on the side thereof facing the rotor 10, the inner stator 30 includes the second stator salient poles 31 which are provided on the side thereof facing the rotor 10 and of which the number is the same as the number of the first stator salient poles 21, and the rotor 10 includes the first rotor salient poles 12 that are provided on the side thereof facing the outer stator 20, and the second rotor salient poles 13 which are provided on the side thereof facing the inner stator 30 and of which the number is the same as the number of the first rotor salient poles 12. For this reason, since the phases of the salient poles in the rotational direction of the rotor 10 are different from each other in the set of the first stator salient poles 21 and the second stator salient poles 31, the switched reluctance motor A, which has a simple and solid structure, can be easily manufactured, and can reduce torque ripple, is obtained.

Further, the present disclosure may also employ the following modification example.

In the following description, the same components as the components of the above-mentioned embodiment or components equivalent to the components of the above-mentioned embodiment will be denoted by the same reference numerals and the description thereof will be simplified or omitted.

Figure 5:
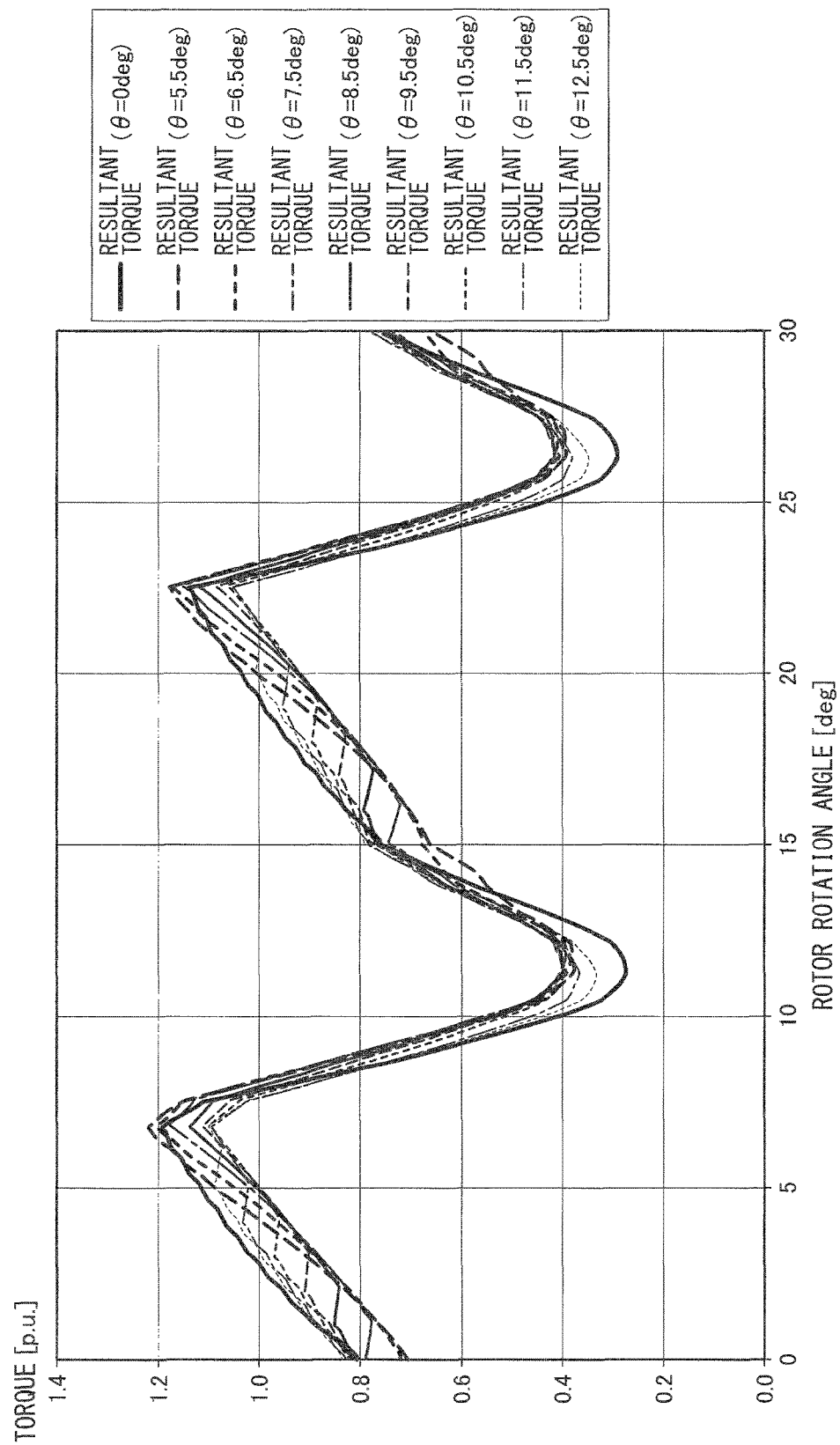
FIG. 5 is a graph showing a relationship between the phase shift angle of a salient pole and resultant torque of a switched reluctance motor according to a modification example of an embodiment of the disclosure.

FIG. 5 is a graph showing a relationship between the phase shift angle of a salient pole and resultant torque of a switched reluctance motor A according to a modification example of the embodiment of the present disclosure. FIG. 5 shows the waveforms of resultant torque in a case in which the phase of each second stator salient pole 31 of the inner stator 30 is gradually delayed in the rotational direction of the rotor 10 (a phase shift angle θ is in the range of 0 to 12.5 [deg]). In FIG. 5, a vertical axis represents torque [p.u.] and a horizontal axis represents a rotor rotation angle [deg].

As shown in FIG. 5, it is found that the waveform of the resultant torque is gradually changed in a case in which the phases of the first stator salient poles 21 of the outer stator 20 and the phases of the second stator salient poles 31 of the inner stator 30 are gradually shifted from each other. When the relationship between average torque [p.u.] of the resultant torque and a torque ripple ratio [%] is summarized, the following Table 1 is obtained.

TABLE 1

| | θ deg | | | | | | | | |
|---|---|---|---|---|---|---|---|---|---|
| | 0 | 5.5 | 6.5 | 7.5 | 8.5 | 9.5 | 10.5 | 11.5 | 12.5 |
| Average torque [p.u.] | 0.77 | 0.77 | 0.77 | 0.77 | 0.77 | 0.77 | 0.77 | 0.77 | 0.77 |
| Torque ripple ratio | 119 | 110 | 107 | 102 | 96 | 93 | 92 | 95 | 100 |

As shown in Table 1, it is found that a torque ripple ratio is lowest in the modification example of FIG. 5 when the phase shift angle θ is set to about 10.5 [deg] in a case in which the average torque is set to be constant.

A torque ripple ratio R is obtained from the following Equation (2) on the basis of the maximum torque Tmax, the minimum torque Tmin, and average torque Tav.

$$R=(Tmax-Tmin)/Tav \times 100 \quad (2)$$

Figure 6:
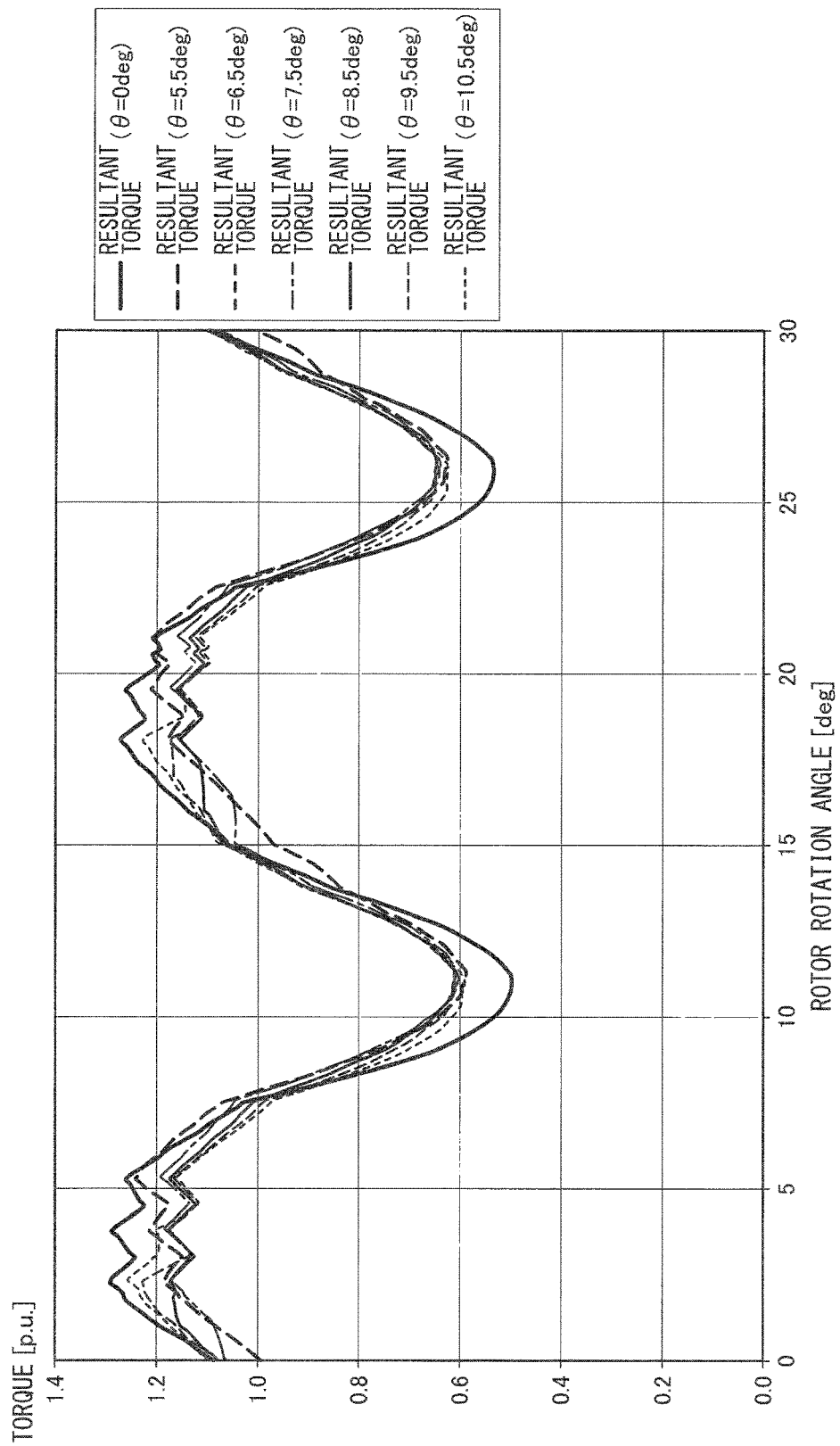
FIG. 6 is a graph showing a relationship between the phase shift angle of a salient pole and resultant torque of a switched reluctance motor according to a modification example of an embodiment of the disclosure.

FIG. 6 is a graph showing a relationship between the phase shift angle of a salient pole and resultant torque of the switched reluctance motor A according to another modification example of the embodiment of the present disclosure. FIG. 6 shows the waveforms of resultant torque in a case in which a current (motor current) flowing in the stator is increased in comparison with that in FIG. 5 to increase an output (torque) and the phase of each second stator salient pole 31 of the inner stator 30 is gradually delayed in the rotational direction of the rotor 10 (a phase shift angle θ is in the range of 0 to 10.5 [deg]). In FIG. 6, a vertical axis represents torque [p.u.] and a horizontal axis represents a rotor rotation angle [deg].

As shown in FIG. 6, it is found that the waveform of the resultant torque is gradually changed in a tendency different from the FIG. 5 in a case in which the phases of the first stator salient poles 21 of the outer stator 20 and the phases of the second stator salient poles 31 of the inner stator 30 are gradually shifted away from each other. When the relationship between average torque [p.u.] of the resultant torque and a torque ripple ratio [%] is summarized, the following Table 2 is obtained.

TABLE 2

| | θ deg | | | | | | |
|---|---|---|---|---|---|---|---|
| | 0 | 5.5 | 6.5 | 7.5 | 8.5 | 9.5 | 10.5 |
| Average torque [p.u.] | 0.95 | 0.95 | 0.95 | 0.95 | 0.95 | 0.95 | 0.95 |
| Torque ripple ratio | 94 | 78 | 74 | 71 | 70 | 76 | 81 |

As shown in Table 2, it is found that a torque ripple ratio is lowest in the modification example of FIG. 6 when the phase shift angle θ is set to about 8.5 [deg]. It is found that the optimum value of the phase shift angle θ of the salient pole in the rotational direction of the rotor 10 depends on the magnitude of a current in the stator as described above. That is, the optimum value of the phase shift angle θ of the salient pole in the rotational direction of the rotor 10 depends on a period in which the current in the stator is applied.

Accordingly, the phase shift angle θ of the salient pole in the rotational direction of the rotor 10 is theoretically set to a half of the stroke angle in the above-mentioned embodiment. However, when data shown in FIGS. 5 and 6 are acquired in advance and the phase shift angle θ is set on the basis of the magnitude of a current (motor current) flowing in the stator, torque ripple can be made to be closer to the minimum.

Figure 7:
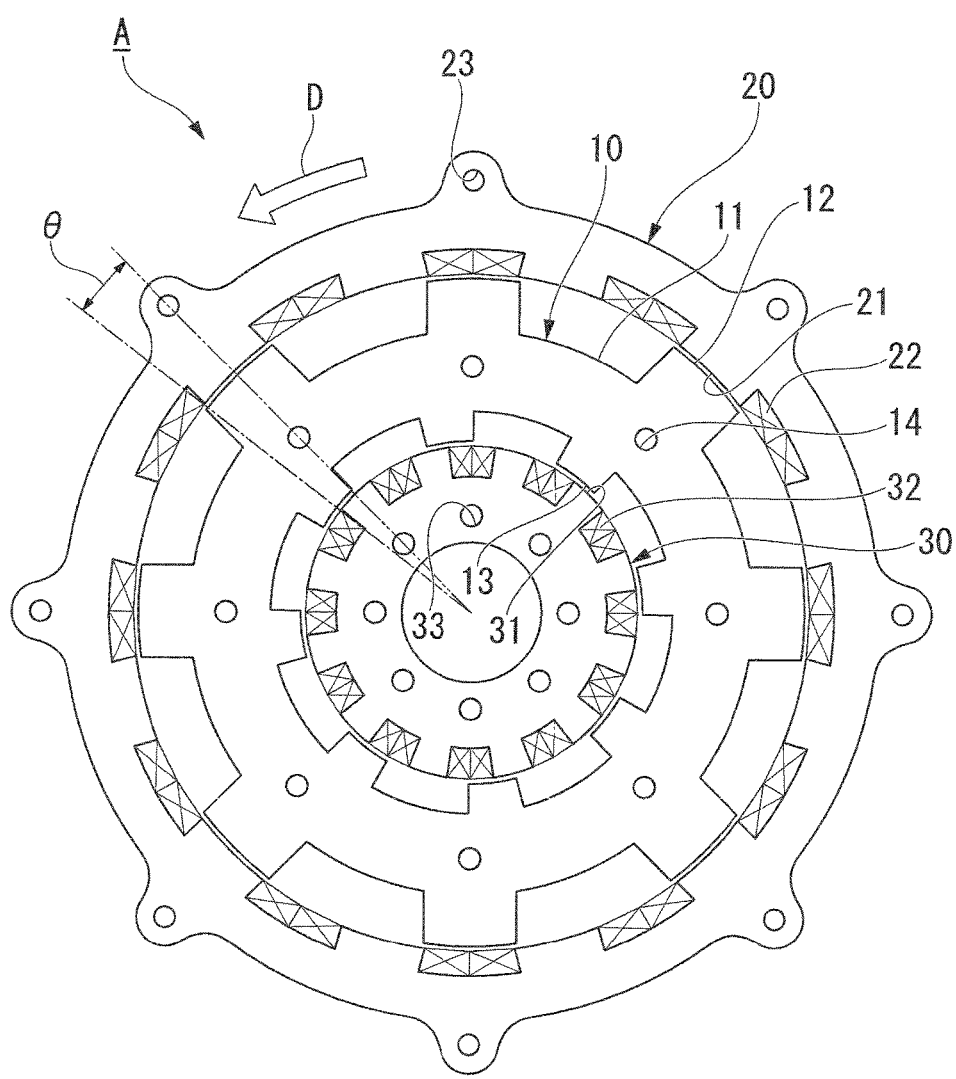
FIG. 7 is a cross-sectional view of a double-stator switched reluctance motor according to a modification example of an embodiment of the disclosure.

Further, the present disclosure may also employ another modification example shown in FIG. 7.

FIG. 7 is a cross-sectional view of a double-stator switched reluctance motor A according to another modification example of the embodiment of the present disclosure.

The phases of the salient poles in the rotational direction of the rotor 10 are different from each other in the set of the first rotor salient poles 12 and the second rotor salient poles 13 in the modification example shown in FIG. 7. According to this structure, since the structure of the rotor 10 needs to be changed but the mounting angles of the outer and inner stators 20 and 30 do not need to be changed, it is possible to relatively simply reduce torque ripple in a case in which it is difficult to change, for example, the mounting angles of the outer and inner stators 20 and 30, specifically, in the case of a switched reluctance motor A that has a large size and a heavy weight.

Figure 8:
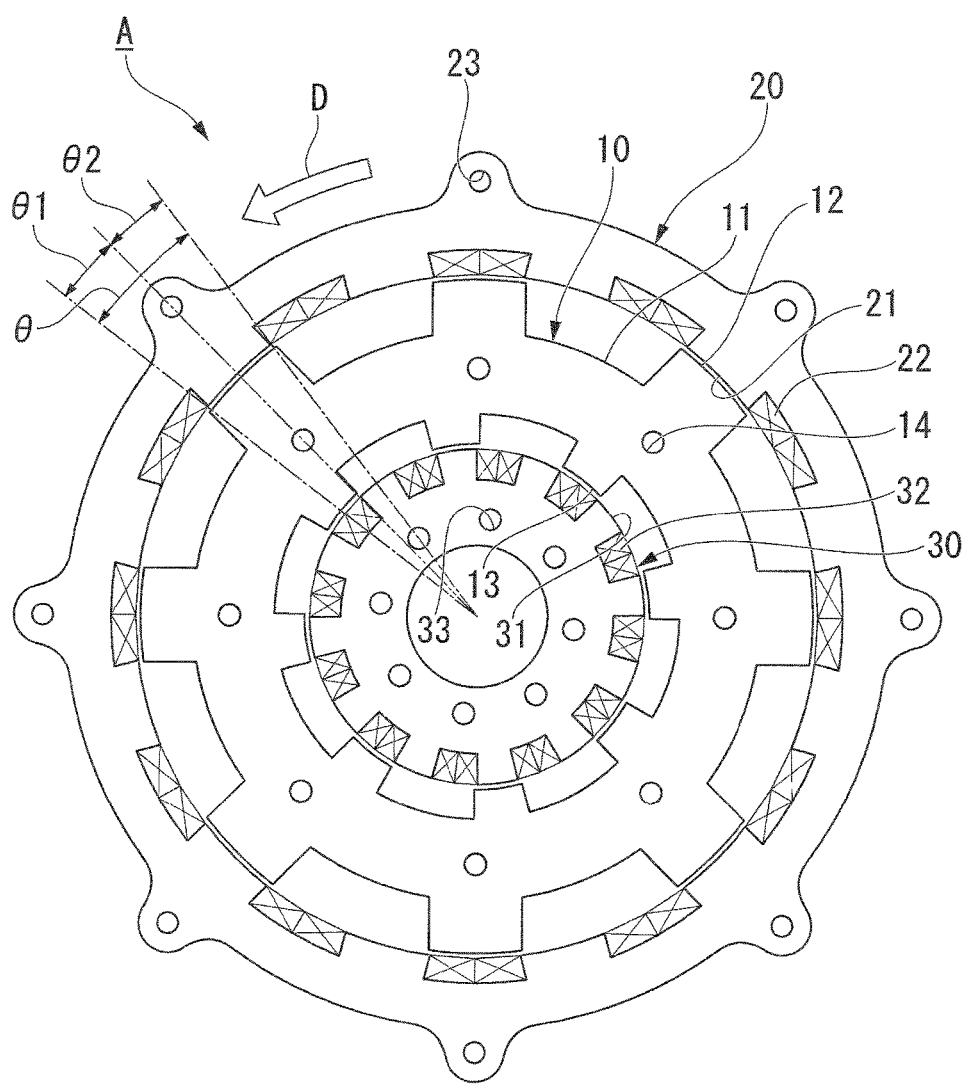
FIG. 8 is a cross-sectional view of a double-stator switched reluctance motor according to a modification example of an embodiment of the disclosure.

Furthermore, the present disclosure may also employ another modification example shown in FIG. 8.

FIG. 8 is a cross-sectional view of a double-stator switched reluctance motor A according to another modification example of the embodiment of the present disclosure.

The phases of the salient poles in the rotational direction of the rotor 10 are different from each other in the set of the first stator salient poles 21 and the second stator salient poles 31 and the set of the first rotor salient poles 12 and the second rotor salient poles 13 in the modification example shown in FIG. 8. According to this structure, since the structure of the rotor 10 and the mounting angles of the outer and inner stators 20 and 30 need to be changed but the phase shift angle θ of the salient pole can be divided into the phase shift angle θ1 of the rotor and the phase shift angle θ2 of the stator, the degree of freedom in changing design is high. Accordingly, it is possible to relatively simply reduce torque ripple.

The preferred embodiment of the present disclosure has been described above with reference to the drawings, but the present disclosure is not limited to the above-mentioned embodiment. The shapes, the combination, and the like of the components described in the above-mentioned embodiment are illustrative, and may be variously modified on the basis of design requirements and the like without departing from the scope of the disclosure.

For example, a three-phase motor is exemplified in the above-mentioned embodiment, but the present disclosure is not limited thereto. The present disclosure can also be applied to a two-phase motor, a four-phase motor, a five-phase motor, and the like.

Furthermore, the 12/8-pole structure of the three-phase motor is exemplified. However, the present disclosure is not limited to the number of the poles and may be applied to, for example, a 6/4-pole structure, an 18/12-pole structure, and the like.

Moreover, for example, a structure in which the double-stator switched reluctance rotating machine of the present disclosure is applied to a motor is exemplified in the above-mentioned embodiment, but the present disclosure may also be applied to a marine propulsion machine or a generator without being limited thereto. Further, the present disclosure can be suitably applied to a large wind power generator as the generator.

INDUSTRIAL APPLICABILITY

According to the present disclosure, a double-stator switched reluctance rotating machine, which has a simple and solid structure, can be easily manufactured, and can reduce torque ripple, is obtained.

What is claimed is:

1. A double-stator switched reluctance rotating machine comprising:
    a rotor;
    an outer stator that is disposed outside the rotor; and
    an inner stator that is disposed inside the rotor,
    wherein the outer stator includes first stator salient poles that are provided on a side thereof facing the rotor,
    the inner stator includes second stator salient poles which are provided on a side thereof facing the rotor and of which the number is the same as the number of the first stator salient poles,
    the rotor is a plurality of electromagnetic steel sheets laminated in an axial direction of the rotor;
    the rotor includes first rotor salient poles that are provided on a side thereof facing the outer stator, and second rotor salient poles which are provided on a side thereof facing the inner stator and of which the number is the same as the number of the first rotor salient poles,
    mechanical phases of the salient poles in a rotational direction of the rotor are different from each other in at least one of a set of the first stator salient poles and the second stator salient poles and a set of the first rotor salient poles and the second rotor salient poles, and
    a mechanical phase shift angle of the salient poles in the rotational direction of the rotor is set according to the magnitude of a current in the outer stator and the inner stator to minimize a torque ripple ratio of the rotating machine.

2. The double-stator switched reluctance rotating machine according to claim 1,
    wherein phases of the salient poles in the rotational direction of the rotor are different from each other in the set of the first stator salient poles and the second stator salient poles.

3. The double-stator switched reluctance rotating machine according to claim 1,
    wherein phases of the salient poles in the rotational direction of the rotor are different from each other in the set of the first rotor salient poles and the second rotor salient poles.

4. The double-stator switched reluctance rotating machine according to claim 1,
    wherein phases of the salient poles in the rotational direction of the rotor are different from each other in the set of the first stator salient poles and the second stator salient poles and the set of the first rotor salient poles and the second rotor salient poles.

5. A double-stator switched reluctance rotating machine comprising:
    an outer stator that includes first salient poles;
    an inner stator including second salient poles that are to face the first salient poles; and
    a rotor that is provided between the outer stator and the inner stator and include third salient poles, which are to face the first salient poles, and fourth salient poles, which are to face the second salient poles,
    wherein the first and second salient poles or the third and fourth salient poles have a mechanical phase difference in a rotational direction of the rotor,
    wherein the mechanical phase difference is set according to the magnitude of a current in the outer stator and the inner stator to minimize a torque ripple ratio of the rotating machine, and
    wherein the rotor is a plurality of electromagnetic steel sheets laminated in an axial direction of the rotor.

6. The double-stator switched reluctance rotating machine according to claim 5,
    wherein phases of the second salient poles are delayed from phases of the first salient poles.

7. The double-stator switched reluctance rotating machine according to claim 5,
    wherein phases of the fourth salient poles are advanced from phases of third salient poles.

8. The double-stator switched reluctance rotating machine according to claim 5,
    wherein phase of the second salient poles are delayed from phases of the first salient poles and phase of the fourth salient poles are advanced from phases of the third salient poles.

* * * * *